United States Patent [19]

Corrigan

[11] 4,221,539
[45] Sep. 9, 1980

[54] LAMINATED AIRFOIL AND METHOD FOR TURBOMACHINERY

[75] Inventor: Charles E. Corrigan, Tempe, Ariz.

[73] Assignee: The Garrett Corporation, Los Angeles, Calif.

[21] Appl. No.: 789,371

[22] Filed: Apr. 20, 1977

[51] Int. Cl.² ............................................. F01D 5/18
[52] U.S. Cl. .................... 416/97 A; 415/115; 416/229 A; 416/231 R
[58] Field of Search ............ 415/115, 116; 416/97, 416/97 A, 229 A, 231 R, 96 A

[56] References Cited

U.S. PATENT DOCUMENTS

| | | | |
|---|---|---|---|
| 2,956,773 | 10/1960 | French | 416/97 |
| 3,301,526 | 1/1967 | Chamberlain | 415/115 |
| 3,515,499 | 6/1970 | Beer et al. | 416/229 A X |
| 3,527,543 | 9/1970 | Howald | 415/115 X |
| 3,767,322 | 10/1973 | Durgin et al. | 416/97 |
| 3,778,183 | 12/1973 | Luscher et al. | 415/115 |
| 3,844,678 | 10/1974 | Sterman et al. | 416/97 |
| 3,864,058 | 2/1975 | Womack | 416/97 |
| 3,872,563 | 3/1975 | Brown et al. | 415/115 X |
| 3,891,348 | 6/1975 | Auxier | 416/96 A X |
| 4,040,767 | 8/1977 | Dierberger et al. | 415/115 |
| 4,056,332 | 11/1977 | Meloni | 415/115 X |

FOREIGN PATENT DOCUMENTS

| | | | |
|---|---|---|---|
| 1245218 | 7/1967 | Fed. Rep. of Germany | 416/97 |
| 1285369 | 8/1972 | United Kingdom | 416/97 A |
| 1366704 | 9/1974 | United Kingdom | 416/97 |
| 1418624 | 12/1975 | United Kingdom | 416/97 |

Primary Examiner—Everette A. Powell, Jr.
Attorney, Agent, or Firm—James W. McFarland; Albert J. Miller

[57] ABSTRACT

Improved structure and method for an internally cooled, laminated stator or turbine blade for turbomachinery includes internal cooling passage configurations within each lamina which promote different forms of cooling of the internal or external surfaces of the blade.

16 Claims, 15 Drawing Figures

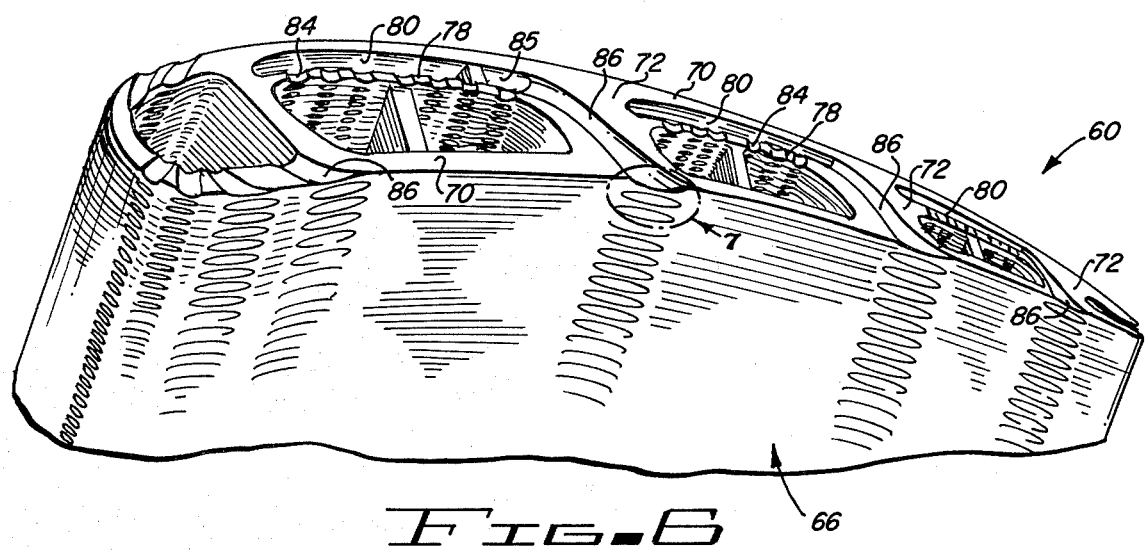
FIG-6
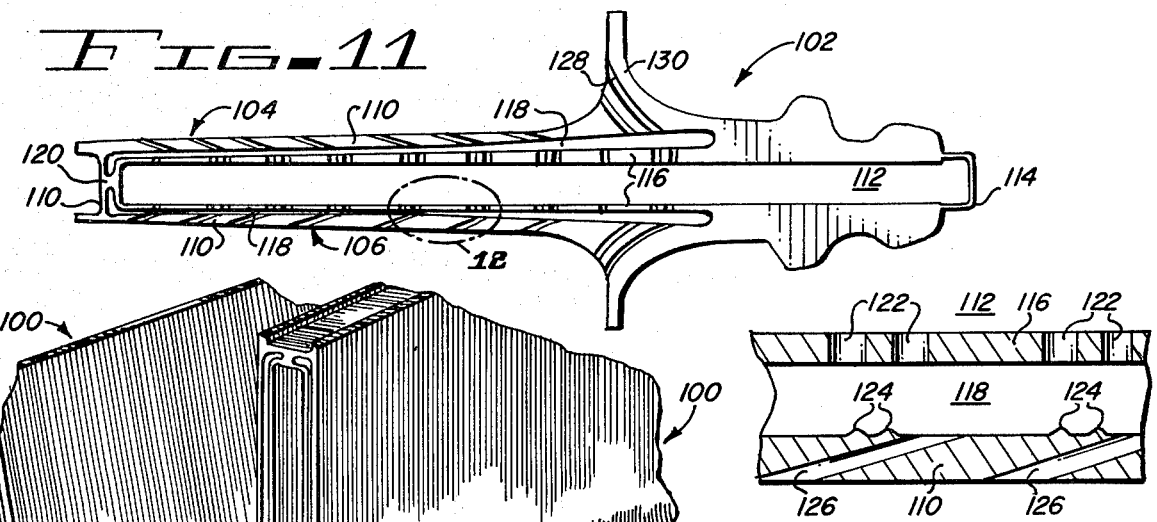
FIG-11
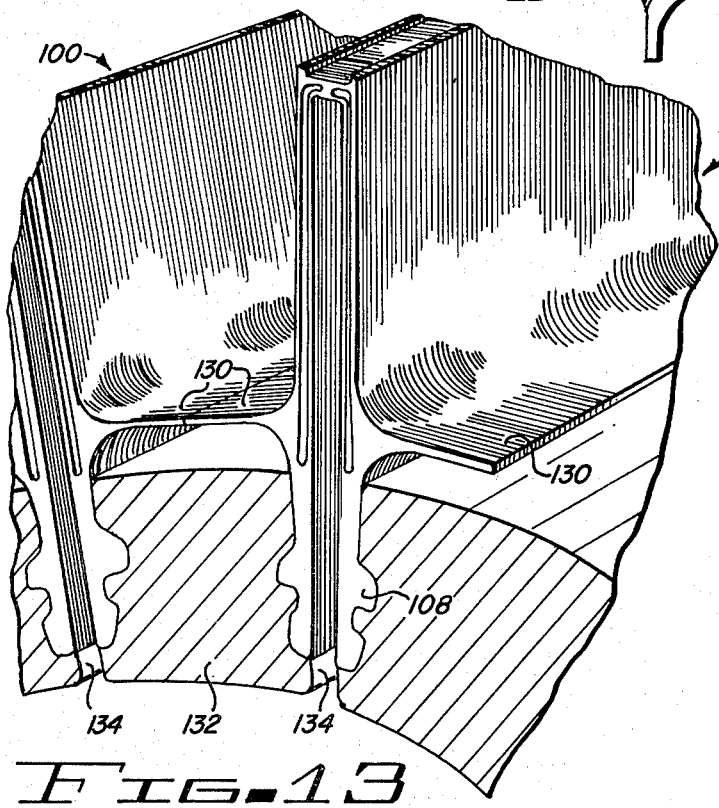
FIG-12
FIG-13
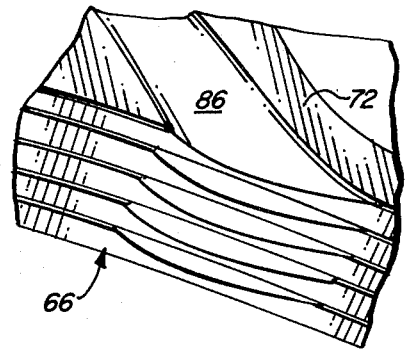
FIG-7

LAMINATED AIRFOIL AND METHOD FOR TURBOMACHINERY

BACKGROUND OF THE INVENTION

This invention relates to aerodynamic airfoil blades typically utilized in rotating turbomachine, and relates more particularly to improved structure and method for internal cooling of such blades.

Turbomachinery such as a gas turbine engine typically includes a rotary compressor which delivery a high olume flow of pressurized gas flow to a combustion chamber wherein the temperature of the gas flow is increased dramatically. The hot gas flow then passes in momentum exchange relationship with one or more turbine wheels to rotate the turbines and produce useful power. Typically, sets of non-rotating stator vanes are included between serially arranged axial turbine wheels to redirect the gas flow into an appropriate direction for efficient momentum exchange relationship with the next succeeding set of turbine blades. It is well known in such turbomachinery that efficiency increases with increase in temperature of the gas flow. A limiting factor in the gas flow temperature is the high temperature capability of the various turbine and stator blades.

Various arrangements for internally cooling the separate stator and turbine blades have been proposed to increase the upper operating temperature capability of the turbomachinery. Exemplary of prior art structure are the disclosure of various turbomachinery blading illustrated in U.S. Pat. Nos. 3,301,526; 3,515,199; 3,628,880; 3,656,863; and 3,927,952. None of the above referenced patents disclose structure and associated advantages as contemplated by the present invention. For instance, a common technique utilized in prior art laminated blade construction such as depicted in the above referenced U.S. Pat. No. 3,656,863 is the attempt to accomplish transpiration cooling of a turbine or stator blade. Transpiration cooling refers to the technique of exhausting cooling flow through the surface to be cooled substantially perpendicularly into the hot gas flow of the turbomachinery to force the hot gas away from the surface. For better effect it is known to introduce the cooling flow from a plurality of minute passages to promote such transpiration cooling. In contrast to such prior art arrangements however, one purpose of the present invention is to avoid such transpiration cooling techniques and instead utilize more efficient film or convection cooling techniques which minimize interference of the cooling fluid flow with the hot gas stream of the turbomachine in order to minimize efficiency reduction in the turbomachinery.

SUMMARY OF THE INVENTION

It is an important object of the present invention to provide improved method and apparatus for cooling an airfoil through internal cooling passage structure within the blade which is constructed from a plurality of bonded, individual, wafer-like laminae.

Another important object of the present invention is to provide improved turbine and stator blade structure in combination with the associated rotor or wheel as may be utilized in turbomachinery of the class described, which utilizes cooling passages formed in each of the various laminae comprising the blade in such a manner as to provide improved cooling by convection, impingement or film techniques at either the inside or external surfaces of the blade in a manner minimizing interference with the hot gas flow of the turbomachinery past the blade.

Another more particular object of the present invention is to provide in a blade or airfoil of the type referred to, an improved cooling passage structure repetitively incorporated in each of a substantial number of the laminae forming the blade, which cooling passage is generally U-shaped with a pair of legs opening into a central cooling passage within the blade, and has an exhaust passage extending to an external surface of the airfoil from approximately the center of the bight portion of the U-shaped passage in order to produce greatly increased efficiency of impingement cooling within the walls of the airfoil.

Another important object of the present invention is to provide cooling structure within a laminated airfoil of the class referred to, wherein the exhaust port is so configured to promote film cooling of the external surface of the airfoil in a manner minimizing interference with the hot gas flow of the turbomachinery.

Another object of the present invention is to provide an airfoil blade of the class described wherein the exhaust port is so configured that exhausting cooling flow from the interior of the blade is introduced into the hot gas mainstream of the turbomachinery almost nearly parallel to the adjacent portion of the hot gas mainstream flow in a manner minimizing reduction of efficiency of the turbomachinery.

Another important object of the present invention is to provide in airfoil blade structure of the class referred to, improved cooling passages within the airfoil which advantageously combines different forms of heat exchange cooling techniques such as impingement, convection or film cooling.

Yet another important object of the present invention is to provide in a stationary stator blade of the class referred to, improved cooling schemes which create impingement cooling of the innerface of the suction surface of the stator blade, film cooling of the external face of pressure surface of the stator blade, without introducing the exhausting cooling air onto the suction surface of the airfoil.

These and various other more particular objects and advantages of the present invention are specifically set forth in or will become apparent from the following detailed description of preferred forms of the invention when read in conjunction with the accompanying drawings.

BRIEF DESCRIPTION OF THE DRAWINGS

FIG. 6 is a different perspective view of the structure shown in FIG. 4;

FIG. 7 is a greatly enlarged detailed view of the portion of FIG. 6 circled by the numeral 7;

FIG. 11 is a plan view of a single lamina utilized in the turbine blade of FIG. 9;

FIG. 12 is an enlarged, detailed view of a portion of the structure circled by the numeral 12 in FIG. 11; and FIG. 13 is a partial, perspective illustration of a turbine wheel incorporating a plurality of turbine blades as depicted in FIG. 9.

DETAILED DESCRIPTION OF THE PREFERRED EMBODIMENTS

Figure 1:
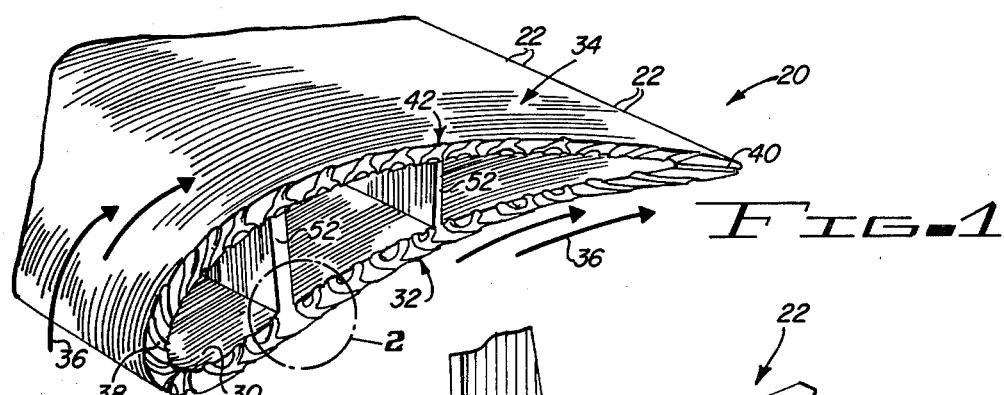
FIG. 1 is a fragmentary, perspective view of a stator blade constructed in accordance with the principles of the present invention.
Figure 2:
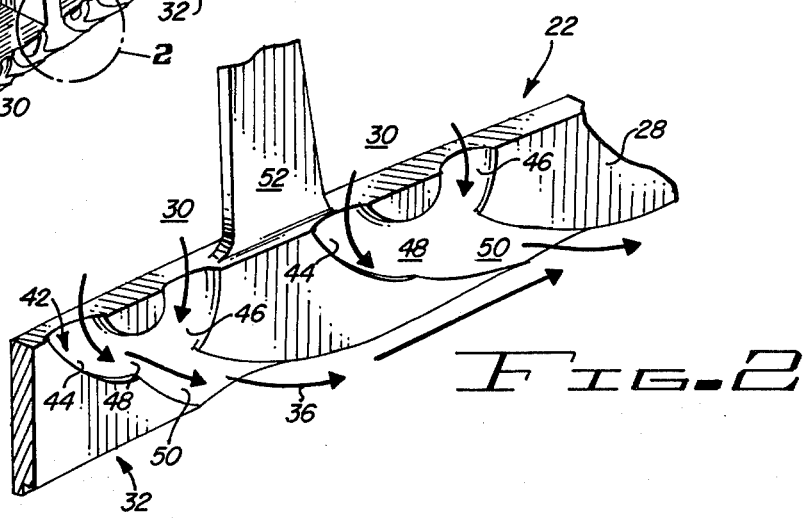
FIG. 2 is an enlarged, partial perspective view of details of construction of the area encircled by the numeral 2 in FIG. 1; while FIG. 2-A is a yet further enlarged view from a slightly different angle of perspective.
Figure 3:
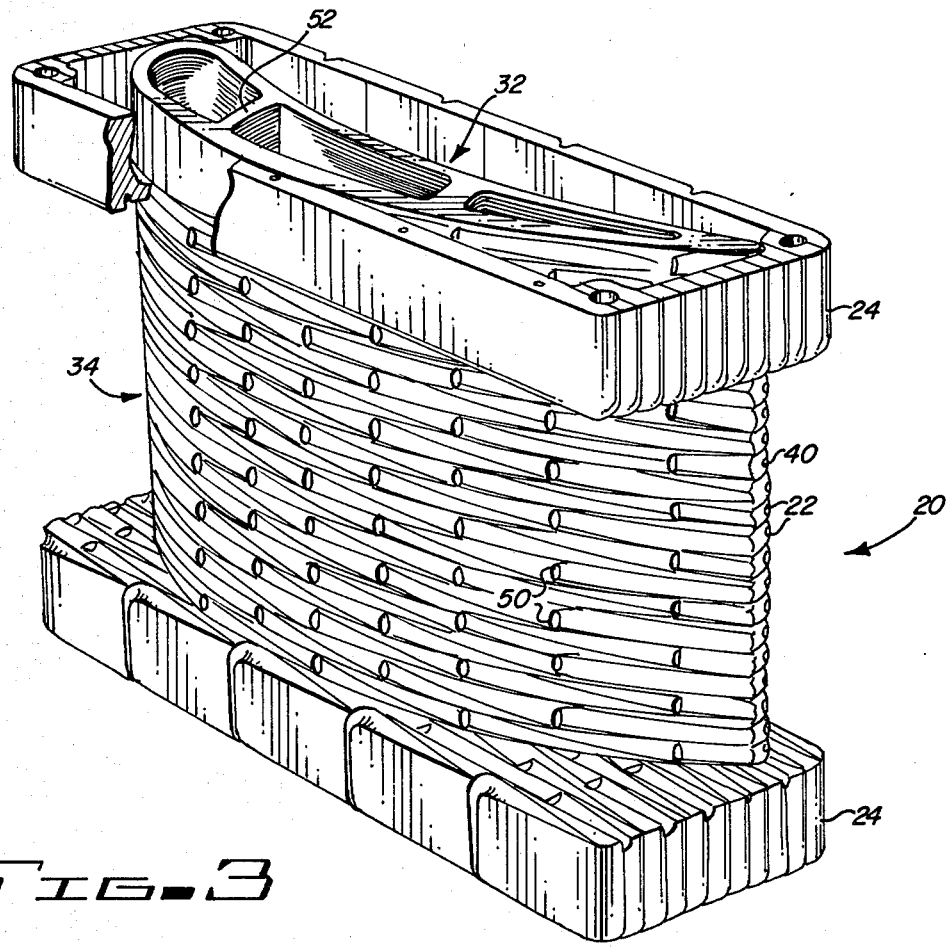
FIG. 3 is a perspective illustration of the stator blade of FIG. 1 with portions broken away to reveal details of construction.
Figure 2A:
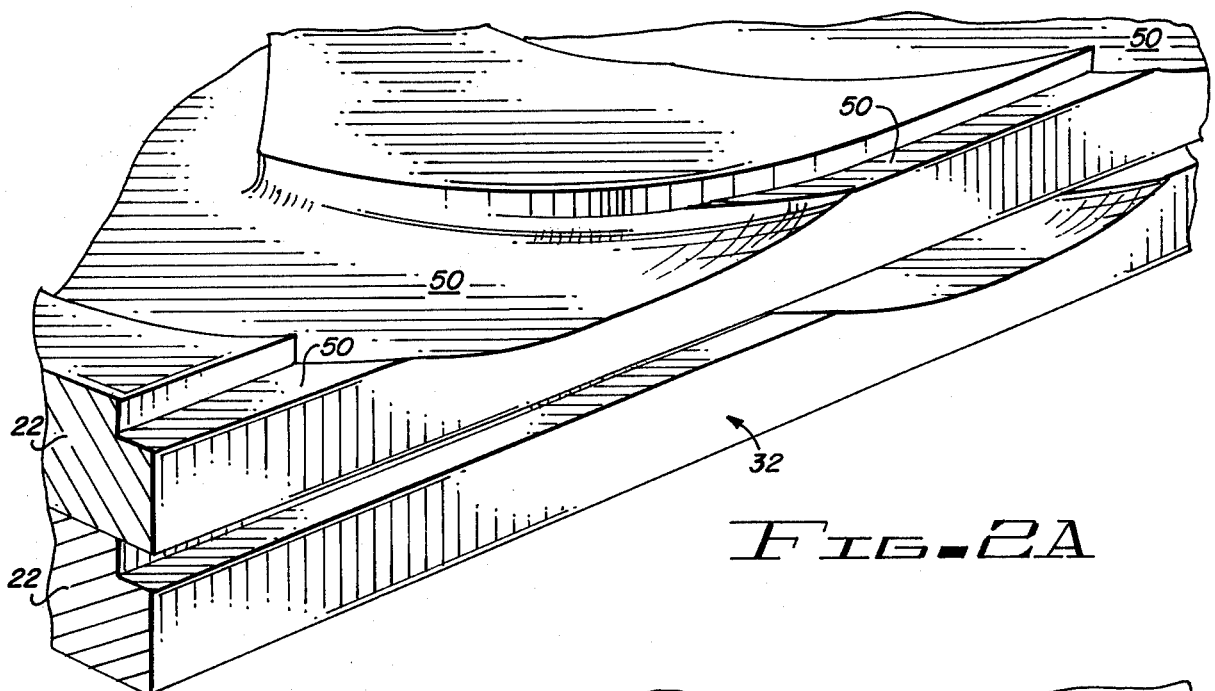
Figure 5A:
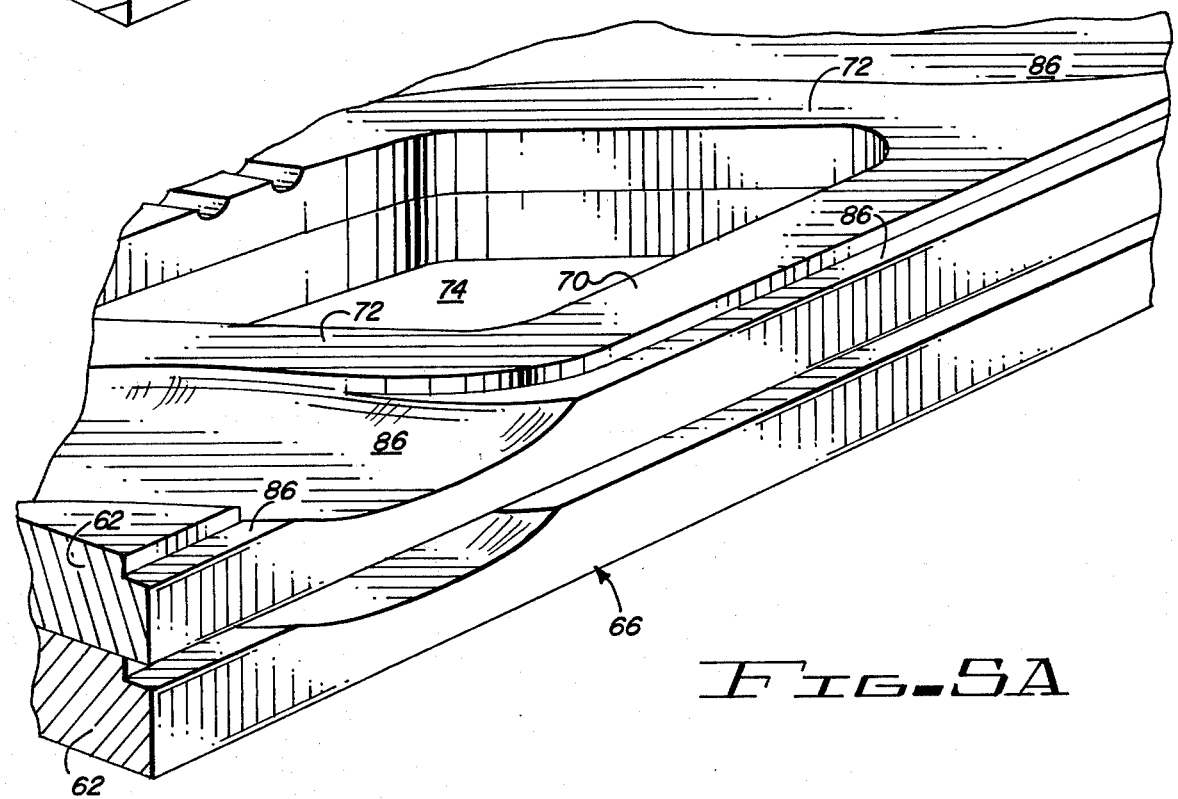
FIG. 5 is an enlarged, partial perspective view of the portion of the stator blade encircled by the numeral 5 in FIG. 4; while FIG. 5-A is a yet further enlarged view from a slightly different angle of perspective.

Referring now more particularly to FIGS. 1–3 of the drawings, there is illustrated an airfoil for use in turbomachinery in the form of a stationary, axial stator blade 20. Blade 20 is of laminated construction comprising a plurality of individual, thin laminae 22 stacked in a radial direction and bonded together to form the major portion of blade 20. As shown in FIG. 3, the blade may be provided with top and bottom platform bases 24, 26 which, if desired, may also be constructed of a plurality of laminae extending in an axial direction as illustrated.

Preferably, each individual lamina 22 is of substantially identical construction comprising a continuous peripheral wall 28 surrounding a relatively large central cavity 30. The various central cavities 30 together form a relatively large internal cavity or passage within the interior of the completed blade which is adapted to receive cooling fluid flow from another portion of the turbomachinery, for instance through either one or both of the top and bottom platforms. Similarly, the peripheral wall 28 of each lamina together form a major portion of the working pair of external surfaces of the airfoil, i.e. the external pressure surface 32 and the external suction surface 34 that are arranged in momentum exchange relationship with the major hot gas fluid flow of the turbomachinery illustrated by the arrows 36.

Each lamina further includes a plurality of separate recesses in the peripheral wall which extend partially therethrough such that upon stacking and bonding the laminae together the recesses define cooling flow passages within the blade 20. Various curved, straight, and serpentine recesses 38 and 40 are respectively included in a portion of each of the laminae which forms corresponding segments of the leading and trailing edges of the airfoil. Intermediate the leading and trailing edges, each lamina forms a segment of both the external pressure and suction surfaces 32 and 34, and includes a plurality of substantially identical recesses 42 disposed regularly along the length of each of the corresponding segments of the pressure and suction external surfaces. Each recess 42 is of generally U-shaped configuration presenting a pair of substantially parallel, chord-wise spaced, spanwise extending legs 44 and 46 each of which opens into the internal cavity 30 of the associated lamina. Extending outwardly from approximately the center of a chord-wise extending bight portion 48 of each U-shaped recess 42 in an exhaust port section 50. Each exhaust port section 50 opens onto the corresponding segment of either the external pressure or suction surface.

Preferably, each exhaust port section 50 curves rather radically in a chord-wise downstream direction relative to the direction of air flow past the corresponding external surface and, as best illustrated in FIG. 2, and FIG. 2-a, actually extends in a downstream direction sufficiently to intercept the next adjacent downstream exhaust port section 50. In combination with this rather long extension of the outer portion of each exhaust port section 50, along with the curved configuration thereof, the exhaust port section 50 assures that cooling flow exhausting therefrom enters the adjacent hot gas fluid flow ofthe turbomachinery in nearly parallel relationship thereto. It has been found that exhaust port section 50 in this arrangement provides an effective angle of introduction of the exhausting cooling flow into the adjacent hot gas fluid stream of less than approximately five degrees and preferably approximately three degrees. Furthermore, it will be noted that the configuration of the exhaust port section 50 assures that its cross-sectional area relatively smoothly increases in the downstream direction to act as a diffusion passage for the exhausting cooling flow.

In operation of the FIG. 1–3 arrangement, each stator blade 20 is constructed by stacking in a radial direction all of the individual lamina 22 and then appropriately bonding them into a unitary article. Each lamina is individually formed such as through conventional photochemical etching technique which permit the construction of carefully configured, but small cooling passages such as recesses 42 is a highly efficient and economical manner. Each of the completed stator blades is secured about the periphery of a central hub to present a circular ring of such stator blades that are normally incorporated intermediate a pair of rotating turbine wheels within the turbomachinery. Relatively cool fluid flow is introduced from an external source into the internal cavity 30 and flows to each of the legs 44, 46 of each recess 42 to promote relatively high impingement of the cooling flow onto the walls of the central bight 48 and to promote good mixing of the cooling flow within the bight. Through this impingement effect, cooling of the peripheral wall is enhanced. Cooling fluid flow from the bight 48 then exhausts through exhaust port section 50 onto the corresponding external pressure or suction surface 32, 34. The relatively long, downstream configuration of each exhaust port section 50, along with the diffusing action afforded thereby, as well as the nearly parallel arrangement of introduction of the exhausting fluid flow into the adjacent hot gas stream flow, all of these factors promote film cooling of the external surface.

The term film cooling refers to the technique of cooling the external surface 32 or 34 by attempting to maintain a relatively stationary layer of cooled fluid along the external surface which moves sufficiently slowly so that the layer acts as an insulative layer to prevent unwanted heating or the external surface by the adjacent hot gas stream fluid flow. In this context the term film cooling is distinguished from what is normally referred to as convection cooling that operates on the completely different principle of maintaining a substantially higher velocity flow of cooling fluid at a surface to carry away heat from the surface by convective action rather than by insulating the external surface from an adjacent heat source. The small effective angle of introduction of the exhausting cooling flow afforded by the present invention minimizes break up of the layer of insulating fluid acting to promote the film cooling, and similarly the diffusing action of the exhaust port section reduces the velocity of the exhausting cooling fluid flowing into the insulative film on the external surface. The relatively long exhaust port section, i.e. extending all the way from an upstrem exhaust port section to the next adjacent downstream exhaust port section promotes the development and maintenance of the insulative film.

Preferably, each of the lamina includes one or more support struts 52 which extend in a span-wise direction with opposite ends of each span 52 integrally formed with the associated segments of the suction and pressure segments of the external surfaces. Each of the struts 52 are thinner than the peripheral wall 28 to assure continuity fluid communication throughout the entire internal cavity 30.

Referring now to FIGS. 4–8, another form of stator blade type airfoil 60 is illustrated. Similar to blade 20 of FIG. 1, blade 60 includes a plurality of thin, stacked, and bonded laminae 62, with each blade 60 disposed at the periphery of a central hub 64 (FIG. 8) to present a circular array of stator blades 60. Again, the individual laminae 62 are stacked in a radial direction relative to the axial configuration of the stator blade and the direction of major gas flow of the turbomachinery therebypassed. Each lamina 62 is of substantially identical configuration, although the particular outer geometry of each one may slightly vary in order that upon stacking of all the lamina a twisted blade configuration results as can best be seen in FIG. 4. Again, each lamina 62 forms a segment of the external pressure and suction surfaces 66 and 68 respectively.

Each lamina 62 has a continuous peripheral wall 70 which has corresponding pressure and suction sections that respectively form the segments of the external pressure and suction surfaces 66 and 68. The wall 70 of each lamina again surrounds a central cavity, the central cavities together forming a relatively large and extensive central passage for receiving cooling fluid flow.

Extending generally spanwise across the central cavity and between the pressure and suction sections of the peripheral wall 70 are a first set of struts 72 that are of a thickness substantially equal to the thickness of the peripheral walls 70. Accordingly, upon stacking and bonding the laminae together to form the completed blade structure, the first set of struts 72 divide the central cavity into a plurality of compartments 74 each of which receiving cooling fluid flow from passages 76 in hub 64. Each compartment 74 may directly communicate with one of the passages 76, or alternately a plenum chamber may be formed at one or more of the lower lamina 62 to afford communcation between the passage 76 and all of the compartments 74.

The structure of each lamina further includes an inner wall 78 spaced slightly inwardly of the suction section of the peripheral wall 70. Inner wall 78 extends substantially chordwise along the major extent of the suction surface 68 to define an impingement volume or zone 80 between the inner wall 78 and the corresponding suction section of peripheral wall 70. It will be noted that the first set of struts 72 also extend across the impingement zone 80 to divide the latter into segments corresponding to each of the compartments 74. For strength purposes, a second set of struts 82 extending generally spanwise between the pressure section of the peripheral wall 70 and the inner wall 78, or between the inner wall 78 and the suction section of the peripheral wall 70 are included. These struts 82 are of less thickness than the peripheral wall 70 and the first set of struts 72 to permit fluid communication across struts 82. Inner wall 70 further includes a plurality of recesses 84 which, upon stacking and bonding the various laminae into the final blade configuration, present corresponding passages allowing fluid communication between the central compartment 74 and the associated portions of the impingement zone 80 in a manner permitting only relatively spanwise, directed fluid flow from the compartment 74 into the impingement zone 80 for substantially perpendicularly impingement against an innerface 85 of the suction section of the peripheral wall 70.

Figure 5:
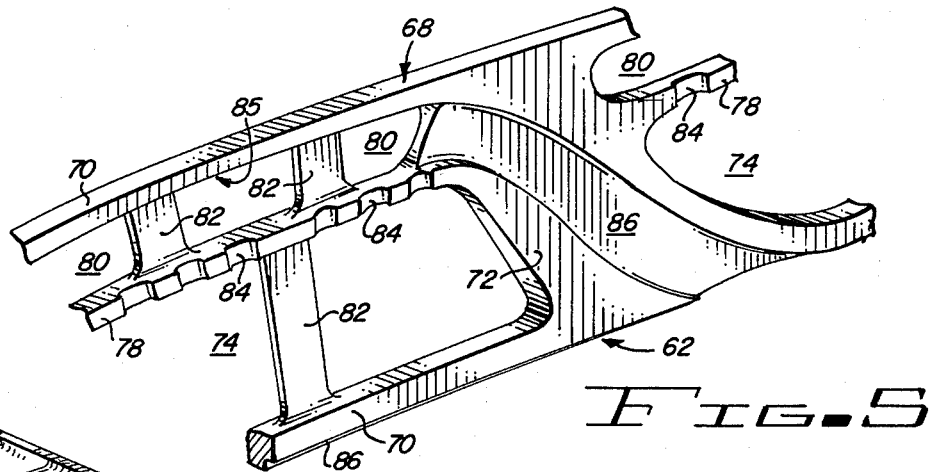
Figure 9:
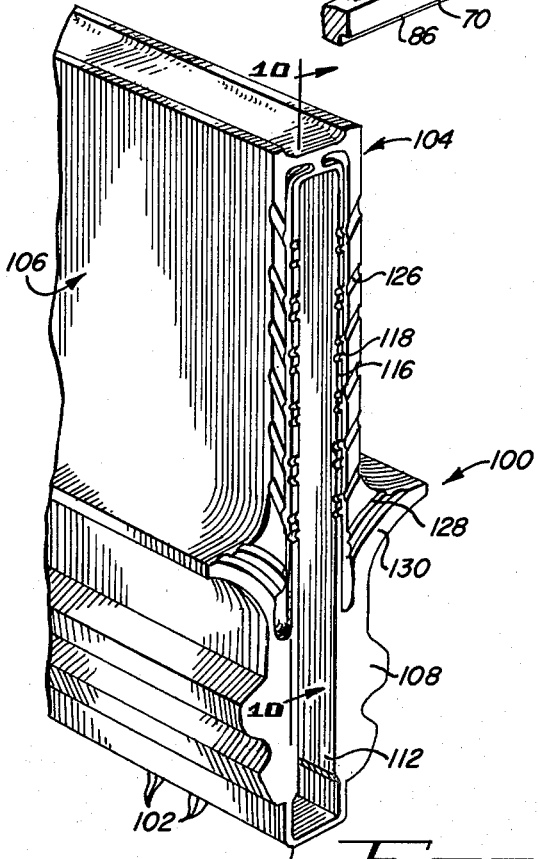
FIG. 9 is a partial perspective view of a rotary turbine blade constructed in accordance with the principles of the present invention.

As illustrated three of the struts 72 further include internal exhaust recesses 86 which afford fluid communication between one of the three sections of the impingement zone 80 and the external pressure surface 66. Preferably, as best illustrated in FIGS. 5, 5-A, and 7, exhaust duct recesses 86 curve in a downstream direction upon approaching external pressure surface 66 and extend along the length of the external pressure surface a sufficient distance so as to intercept the next downstream exhaust recess associated with a corresponding downstream strut 72. Accordingly, it will be seen that the exhaust recesses 86 are configured to operate similarly to the exhaust port sections 50 of FIG. 1 embodiment in that the exhaust recesses 86 produce improved film cooling of the external pressure surface 66 by virtue of the elongated length of recess 86, its expanding cross-sectional configuration to act as a diffusion passage, and the configuration of the exhaust recess 86 which assures introduction of the exhausting fluid flow therefrom into the hot gas mainstream of the turbomachinery in almost parallel relationship thereto, i.e. at an effective angle of five degrees or less and preferably approximately three degrees. As necessary, each lamina 62 further includes recesses 88 in the peripheral wall 70 in the leading and trailing edge portions of the blade.

The blade 60 is constructed preferably by photo-chemical etching of each of the lamina 62 to form all the internal openings and recesses therewithin. The laminae are then stacked in a radial direction and bonded into unitary article to produce the intricate cooling passages and recesses described. Several such blade 60 are then affixed in regularly spaced relation about the periphery of a hub 64 or otherwise interconnected to present a circular ring of stator blade 60 adapted to be mounted in stationary, non-rotating relationship with turbomachinery of the class described.

During operation of the turbomachinery hot gas fluid flow flows between the several stator blade 60 and in momentum exchange relationship with the external pressure and suction surfaces 66 and 68 thereof. Cooling fluid flow is introduced through one or more passages 76 in a generally radially outward direction into compartments 74. It will be apparent to those skilled in the art that the outer radial end of the blade 60 is closed by an appropriate closure element such that exhaust of cooling fluid flow from the internal passages within the blade only proceeds through the recesses 86, 88. The cooling fluid flow in compartment 74 is then directed in a substantially spanwise direction into impingement zone 80 to impinge upon inner face 85 of peripheral wall 70. In this manner the relatively thin peripheral wall forming a segment of the external suction surface is cooled through impingement action from the internal side thereof. It is important to note in this embodiment that the external suction surface 68 of stator blade 60 is smooth and has no exhaust ports opening thereonto. Thus the suction section of the peripheral wall 70 is appropriately cooled internally without introducing efficiency reducing fluid flow onto the external suction surface 68. The spanwise directed flow through recesses 84 promote substantial turbulence of the fluid flow in the impingement zone 80 prior to its exhaust through recess 86. As mentioned previously, the configuration of exhaust recess 86 promotes film cooling of the external pressure surface 66 in a manner similar to that described previously with respect to FIG. 1 embodiment.

From the foregoing it will be apparent that the FIG. 4-8 arrangement contemplates an improved method of cooling a laminated stator blade 60 which includes the steps of introducing cooling fluid flow generally radially into the central cavity composed of the several compartments 74. The cooling fluid flow is then directed span-wise substantially perpendicularly against the inner face 85 of the portion of the peripheral wall 70 defining the external suction surface of blade 60 so as to promote impingement or convection cooling of that portion of the peripheral wall without introducing any cooling flow onto the suction surface 68. After impingement cooling of the inner face 85 the cooling flow is then exhausted onto pressure surface 66 in such a manner as to promote film cooling of the external pressure surface. More particularly film cooling of the external pressure surface is accomplished by exhausting the cooling flow in a generally chordwise downstream direction at an effective angle of less than approximately five degrees to the direction of the hot gas flow passed the external pressure surface, and by diffusing the cooling flow while it is in the exhaust recess 86 prior to exhausting onto external pressure surface 66.

Figure 10:
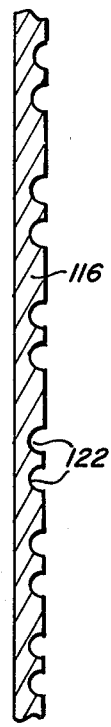
FIG. 10 is a fragmentary cross-sectional elevational view taken along lines 10—10 of FIG. 9.

FIGS. 9-13 illustrte a rotary, laminated, axial turbine blade 100 constructed in accordance with the principles of the present inventon. Blade 100 comprises a plurality of similarly configured, radially extending laminae 102 which are stacked and bonded together in a chordwise direction relative to the hot gas flow of the turbomachinery passing external pressure and suction surfaces 104 and 106 of the blade. As best shown in FIGS. 10-12, each individual lamina 102 includes a fir tree configuration 108 at the radially inner end thereof, a radially elongated peripheral wall 110 which defines associated segments of the external pressure and suction surfaces of the blade, and an elongated central cavity or passage 112 surrounded by a peripheral wall 110 and the fir tree configuration 108. The peripheral wall 110 closes the radially outer end of the blade, while the inner radial end of the central passage 112 is open. In FIG. 11 a removable supporting strut 114 is illustrated. This supporting strut 114 is used simply for supporting the laminae prior to bonding thereof, and is removed subsequent to bonding of the lamina into a unitary article.

An inner wall 116 spaced slightly inside the peripheral wall 110 also extends along the entire length of both the external pressure and surface suction surfaces so as to define a radially elongated impingement zone 118 between the walls 110 and 116. Inner wall 116 also closes the radially outer end of the blade, and a support strut 120 extends radially between the inner and outer walls 110 and 116 at the outer end to provide support for the inner wall 116. A plurality of spanwise extending recesses 122 are arranged in doublet configuration and spaced generally regularly along the length of the inner wall 116. As illustrated in FIG. 10 each of the recesses 122 is of approximately one-half the thickness of the associated lamina 102 such that upon bonding the several laminae together each of the recesses 122 defines a cooling fluid flow carrying passage communicating the central cavity 112 with impingement zone 118.

On the inner face of wall 110 are provided associated protrusions 124 also arranged in doublet fashion and in substantially facing relationship to associated recesses 122 in the inner wall 116. The peripheral wall 110 further includes a plurality of exhaust duct recesses 126 which extend from impingement zone 118 in a generally radially outward direction within peripheral wall 110 to open onto the associated segments of the external pressure and suction surfaces 104, 106 of the blade. As best shown in FIG. 12 the exhaust port recesses 126 are arranged to open into impingement zone 118 in non-aligned relationship with the recesses 122 of inner wall 116. Exhaust ports 128 may also be incorporated within a spanwise extending platform section 130 of each lamina.

As illustrated in FIG. 13 a plurality of such rotary turbine blades 100 are mounted about the periphery of a central hub 132 with their inner fir tree configured portions 108 mounted in interlocking relationship with the hub 132. Passages 134 in the hub carry cooling fluid flow to the inner end of each of the central passages 112 of the several blades 100. The platform sections 130 of each blade cooperate with the corresponding platforms of adjacent blades to enclose the radially inward side of the axial extending blades and define hot gas flow carrying passages between the several blades.

Together the hub 132 and several blades 100 present a turbine wheel which is caused to rotate by the momentum exchange of hot gas flow past the external pressure and suction surfaces of the several blades 100. Cooling fluid flow from hub passage 134 is introduced to flow radially outwardly through the central passage 112. The cooling fluid flow is then turned to flow in a generally spanwise direction from passage 112 into the impingement zone 118 to impinge substantially perpendicularly upon the interface of peripheral wall 110. Flow from recesses 122 impinges substantially directly upon corresponding protrusions 124 to promote substantial turbulence of fluid of exhausting cooling flow within impingement zone 118. As a result substantial impingement or convection cooling of the peripheral wall 110 is accomplished from the interior of the blade. Being offset from the recesses 122, the exhaust port recesses 126 promote further turbulence and flow of the exhausting of the cooling flow within impingement zone 118 prior to exhaust thereof through the ports 126 onto the external pressure and suction surfaces. In contrast to the previously described embodiments, the exhaust port recessses are not configured to produce film cooling of the external pressure and suction surfaces 104 and 106 since the blades 100 are rotating within the turbomachinery. The radially extending arrangement of the several exhaust ports 126 and 100 does produce a centrifugal pumpiing action on the cooling fluid flow within impingement zone 118 to increase the flow of cooling fluid flow through the various passages within the blade as it rotates. Accordingly it will be seen that the FIG. 9-13 arrangement of a rotating turbine blade incorporates the improved technique of impingement cooling from the inside of a blade similarly to that accomplished by the impingement zone 80 of the FIG. 4–8 embodiment.

Figure 4:
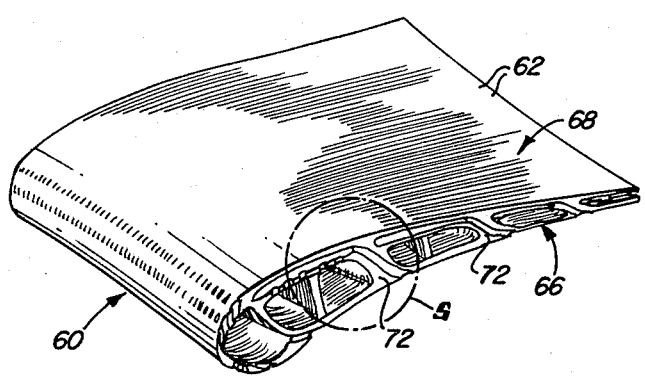
FIG. 4 is a perspective view of yet another form of stator blade as contemplated by the present invention.
Figure 8:
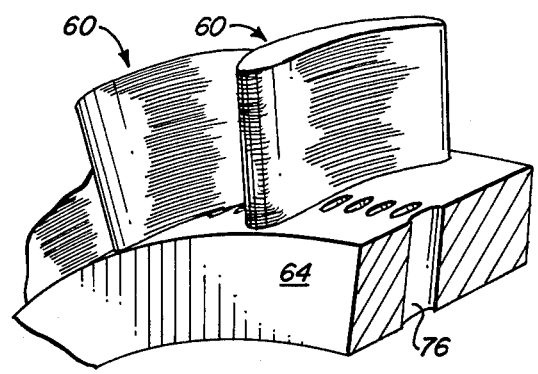
FIG. 8 is a partial view of a plurality of the stator blades such as depicted in FIG. 4 as mounted to a central hub to form a non-rotating set of stator blades.

It will be apparent to those skilled in the art that preferably the rotary turbine blade 100 is constructed with various compound curvature for most efficient momentum exchange with the hot gas flow of the turbomachinery similarly to the compound curvature configuration of the stator blade of FIG. 4. Also, it will be apparent that the axial ends of blade 100, shown in FIG. 13 to reveal internal construction details, are closed such that cooling fluid in the interior of the blade escapes only through exhausts 126, 128.

While three embodiments of the present invention have been specifically illustrated and discussed, the foregoing detailed description should be considered exemplary in nature and not as limiting to the scope and spirit of the invention as set forth in the appended claims.

Having described the invention with sufficient clarity that those skilled in the art may make and use it, I claim:

1. An airfoil for use in turbomachinery comprising a plurality of thin, stacked laminae bonded together to form a major portion of said airfoil and a major portion of an external surface of the airfoil adapted to be arranged in momentum exchange relationship with the major fluid past said airfoil; each lamina of a set of said laminae having internal recesses therein defining internal cooling passages within said airfoil, and defining upstream and downstream exhaust ports opening onto said external surface at locations spaced chordwise along said external surface, said upstream exhaust port of each lamina configured to extend downstream in a chordwise direction along said external surface a sufficient distance to intercept the associated downstream exhaust port.

2. An airfoil as set forth in claim 1, wherein said airfoil comprises a stator blade.

3. An airfoil as set forth in claim 2, wherein said laminae form major portions of both a pressure external surface and a suction external surface, said upstream and downstream exhaust ports opening onto said pressure external surface.

4. An airfoil as set forth in claim 3, wherein each lamina defines upstream and downstream exhaust ports opening onto both of said external pressure and suction surfaces.

5. An airfoil as set forth in claim 1, wherein said upstream and downstream exhaust ports each curve in a chordwise downstream direction and are arranged whereby the effective angle between exhaust flow therefrom and the direction of said major fluid flow past the airfoil is less than approximately five degrees.

6. An aerodynamic airfoil blade for use in turbomachinery comprising a plurality of stacked laminae bonded together to form said blade with an external surface thereof adapted to be arranged in momentum exchange relationship with the working fluid flow of the turbomachinery; said laminae having through apertures therein defining internal cooling passages within said blade; at least some of said laminae having partial recesses therein cooperating with adjacent laminae to define cooling paths within individual laminae; at least one set of said recesses defining upstream and downstream exhaust ports for the associated lamina opening onto said external surface of the blade at locations spaced chordwise along said external surface for exhausting cooling flow into said working fluid flow; each of said recesses of said one set arranged whereby the effective angle between exhaust flow from each of said exhaust ports and the direction of said working fluid flow at the associated exhaust port is less than approximately five degrees, said upstream exhaust port of each lamina configured to extend downstream in a chordwise direction along said external surface a sufficient distance to intercept the associated downstream exhaust port.

7. An airfoil blade as set forth in claim 6, wherein said effective angle is approximately three degrees.

8. An airfoil blade as set forth in claim 7, wherein said airfoil blade comprises a stator blade.

9. An airfoil for use in turbomachinery comprising a plurality of thin, stacked laminae bonded together to form a major portion of said airfoil;

each lamina of a set of said laminae having a relatively thin external wall, said external walls of said set together defining a major portion of an external surface of said airfoil adapted to be arranged in momentum exchange relationship with the working fluid flow of said turbomachinery;

each lamina of said set having a relatively large internal through passage, said central passages together defining an internal cavity in said blade adapted to receive cooling fluid flow;

each lamina of said set having an inner wall spaced closely inwardly of said external wall and extending generally parallel thereto to define a through zone therebetween, said through zones together forming an impingement zone between said external and inner walls extending along the length of said major portion of the airfoil external surface;

each lamina of said set having a plurality of recesses in said inner wall extending generally perpendicularly to the inner face of said external wall whereby cooling flow from said cavity passes through said recesses into said impingement zone to impinge substantially perpendicularly upon said inner face to promote cooling of said external wall; and means defining an exhaust path for exhausting cooling flow from said impingement zone, said external walls of the set defining major portions of both an external suction surface and an external pressure surface of said stator blade, said inner wall being spaced inwardly of the portion of said external defining a major portion of said external suction surface of the stator blade, said means defining an exhaust path including an exhaust port opening onto said external pressure surface of the stator blade.

10. An airfoil as set forth in claim 9, wherein said airfoil comprises a stator blade.

11. An airfoil as set forth in claim 9, wherein said airfoil comprises a cooled, rotary turbine blade for use in turbomachinery.

12. An airfoil as set forth in claim 11, wherein said external walls of the set together define major portions of both an external pressure surface and an external suction surface of said turbine blade, said inner wall being spaced closely inwardly of both said external pressure surface and external suction surface, said means defining an exhaust path including exhaust ports in said external wall opening onto both of said external pressure and suction surfaces.

13. An airfoil as set forth in claim 12, wherein said external wall has an inner face exposed to said impingement zone, said inner face having protrusions thereon generally aligned with said recesses in the inner wall to promote turbulence of cooling fluid flow in said impingement zone.

14. In combination with a plurality of airfoils each as set forth in claim 9, a central hub having internal passages for carrying cooling fluid flow, said plurality of airfoils being secured in regularly spaced relationship about the periphery of said hub and extending radially outwardly therefrom, said internal cavities of each of said airfoils communicating with said internal passages of said central hub.

15. A cooled, nonrotating stator blade for use in turbomachinery comprising a plurality of thin, stacked laminae bonded together to form the major portion of said stator blade including external pressure and suction surfaces thereof adapted to be arranged in momentum exchange relationship with fluid flow of the turbomachinery, each lamina comprising:
  a single peripheral wall forming segments of said external pressure and suction surfaces and surrounding a relatively large central cavity for receiving cooling fluid flow;
  a plurality of struts extending span-wise across said central cavity and with opposite ends integrally formed with said peripheral wall, the thickness of said struts being less than that of said peripheral wall;
  a plurality of separate recesses in said peripheral wall extending from said central cavity to open onto said pressure and suction surfaces, each of said recesses comprising:
    a pair of span-wise extending parallel legs opening separately into said central cavity,
    a chordwise extending bight communicating with obth of said legs, and
    a single exhaust port section extending from approximately the center of said bight outwardly to open onto the associated segment of the external surface, said exhaust port section curving in a chordwise downstream direction and arranged whereby the effective angle between exhaust flow from said exhaust port section and the direction of said fluid flow of the turbomachinery is less than approximately five degrees, said exhaust port section extending along said associated segment of the external surface a sufficient distance to intercept the exhaust port section of the downstream next-adjacent recess.

16. A cooled, nonrotating stator blade for use in turbomachinery comprising a plurality of thin laminae stacked generally in a first direction and bonded together to form the major portion of said stator blade including external pressure and suction surfaces thereof adapted to be arranged in momentum exchange relationship with fluid flow of the turbomachinery, each lamina comprising:
  a peripheral wall including pressure and suction sections respectively forming segments of said external pressure and suction surfaces, said wall surrounding a relatively large central cavity for receiving cooling fluid flow;
  an inner wall spaced closely inwardly of said suction section of the peripheral wall and extending generally parallel thereto to define an impingement zone of said central cavity extending along the length of said suction section of the peripheral wall;
  a first set of struts extending generally spanwise across said central cavity between said pressure and suction sections of the peripheral wall to divide said central cavity into separate compartments, said inner wall, peripheral wall and first set of struts being of equal thickness in said first direction;
  a second set of struts having a thickness less than that of said peripheral wall and arranged to extend generally spanwise across said compartments;
  a plurality of recesses in said inner wall extending generally peripendicularly thereto whereby cooling flow from said cavity passes through said recesses into said impingement zone to impinge substantially perpendicularly upon an inner face of said suction section of the peripheral wall to promote cooling of said suction section without introducing cooling flow onto said external suction surface; and
  exhaust duct recesses in at least some of said first set of struts opening into said impingement zone and opening onto said external pressure surface for exhausting cooling fluid flow from said impingement zone, said exhaust ducts curving in a chordwise downstream direction and arranged whereby the effective angle between exhausting cooling flow from said exhaust duct and the direction of said fluid flow of the turbomachinery is less than approximately five degrees, said exhaust duct extending along said segment of the external pressure surface a sufficient distance to intercept the exhaust duct of the downstream next-adjacent strut of said first set.

* * * * *